(12) United States Patent
Locke

(10) Patent No.: US 11,173,628 B2
(45) Date of Patent: Nov. 16, 2021

(54) ADJUSTABLE MOLD AND METHOD FOR MANUFACTURING DRAINAGE CHANNELS

(71) Applicant: ABT, INC., Troutman, NC (US)

(72) Inventor: Blake Locke, Houston, TX (US)

(73) Assignee: ABT, INC., Troutman, NC (US)

( * ) Notice: Subject to any disclaimer, the term of this patent is extended or adjusted under 35 U.S.C. 154(b) by 114 days.

(21) Appl. No.: 16/467,470

(22) PCT Filed: Dec. 6, 2017

(86) PCT No.: PCT/US2017/064963
§ 371 (c)(1),
(2) Date: Jun. 6, 2019

(87) PCT Pub. No.: WO2018/106838
PCT Pub. Date: Jun. 14, 2018

(65) Prior Publication Data
US 2020/0070384 A1    Mar. 5, 2020

Related U.S. Application Data

(60) Provisional application No. 62/430,731, filed on Dec. 6, 2016.

(51) Int. Cl.
*B28B 7/00*    (2006.01)
*B28B 7/02*    (2006.01)
(Continued)

(52) U.S. Cl.
CPC .............. *B28B 7/02* (2013.01); *B28B 7/0041* (2013.01); *B28B 7/0044* (2013.01); *B28B 7/16* (2013.01); *B28B 7/30* (2013.01); *B29C 45/26* (2013.01)

(58) Field of Classification Search
CPC ......... B28B 7/02; B28B 7/0041; B28B 7/044; B28B 7/16; B28B 7/30; B29C 45/26
(Continued)

(56) References Cited

U.S. PATENT DOCUMENTS 760,681 A * 5/1904 Campbell ............... B29C 45/26
                                                     249/105
828,140 A * 8/1906 Robbins ................ B28B 7/0044
                                                     249/171
(Continued)

FOREIGN PATENT DOCUMENTS

DE      29512165 U1    7/1995
JP      H11188715 A    7/1999
JP      2001003441 A   1/2001

OTHER PUBLICATIONS

Machine Translation of DE 29512165 U, Varvaroussis, Konstantin, 27 pages. (Year: 2021).*

(Continued)

*Primary Examiner* — Xiao S Zhao
*Assistant Examiner* — Emmanuel S Luk
(74) *Attorney, Agent, or Firm* — Moore & Van Allen PLLC; Henry B. Ward, III

(57) ABSTRACT

An adjustable mold capable of making castings of various configuration is provided. The adjustable mold has an adjustable die with a core and an adapter, a protrusion, a cavity, and an outer portion with at least two sidewalls, at least two endwalls, and a base therebetween, which outer portion at least partially surrounds the adjustable die to thereby define a mold. During casting, molding material is poured in the mold and allowed to cure to make a casting. The adapter is replaceable to enable castings of multiple configurations to be cast suing the adjustable mold.

18 Claims, 3 Drawing Sheets

(51) Int. Cl.
  *B28B 7/16* (2006.01)
  *B28B 7/30* (2006.01)
  *B29C 45/26* (2006.01)

(58) Field of Classification Search
  USPC .................................................. 249/53 R
  See application file for complete search history.

(56) References Cited

U.S. PATENT DOCUMENTS

| | | | | |
|---|---|---|---|---|
| 1,181,035 | A * | 4/1916 | Refsnider | B28B 7/0044 249/171 |
| 1,817,391 | A * | 8/1931 | Miller | B28B 7/0014 249/104 |
| 2,844,857 | A * | 7/1958 | Jones | B28B 7/0044 249/63 |
| 3,267,527 | A * | 8/1966 | Brown | B22C 9/06 164/44 |
| 3,553,797 | A | 1/1971 | Horton | |
| 3,871,611 | A | 3/1975 | Taketa | |
| 4,177,229 | A * | 12/1979 | Moore | B28B 7/04 249/145 |
| 4,565,347 | A * | 1/1986 | Ditcher | B28B 7/04 249/11 |
| 4,606,878 | A * | 8/1986 | Day | B28B 7/30 264/308 |
| 4,614,326 | A * | 9/1986 | Strickland | B28B 7/30 249/152 |
| 4,801,417 | A * | 1/1989 | Ditcher | B28B 7/04 264/250 |
| 4,941,643 | A * | 7/1990 | Ditcher | B28B 7/04 249/145 |
| 5,262,116 | A * | 11/1993 | Von Holdt, Sr. | B29C 45/2673 264/297.2 |
| 7,774,988 | B2 * | 8/2010 | Guitoneau | E02D 29/124 52/20 |
| 8,262,977 | B2 * | 9/2012 | Schlusselbauer | B28B 7/168 264/333 |
| 8,480,503 | B2 * | 7/2013 | Wilbur | B29C 33/126 473/125 |
| 10,538,045 | B2 * | 1/2020 | Gaut | B29C 33/405 |
| 10,596,774 | B2 * | 3/2020 | Duran | B29D 30/56 |
| 2006/0087056 | A1 * | 4/2006 | Schlusselbauer | B28B 7/18 264/333 |
| 2009/0290935 | A1 | 11/2009 | Gunter | |
| 2013/0059026 | A1 | 3/2013 | Schlusselbauer | |
| 2013/0248680 | A1 | 9/2013 | Fergeson | |
| 2015/0008606 | A1 * | 1/2015 | Sahala | B28B 7/30 264/40.5 |

OTHER PUBLICATIONS

Supplemental European Search Report issued by the European Patent Office for International Patent Application No. PCT/US2017/064963 dated Jun. 22, 2020.
International Search Report dated Feb. 14, 2018, for related International Patent Application No. PCT/US2017/064963.
Written Opinion dated Feb. 14, 2018, for related International Patent Application No. PCT/US2017/064963.
International Preliminary Report on Patentability dated Jun. 20, 2019 for related International Patent Application No. PCT/US2017/064963.

* cited by examiner

ADJUSTABLE MOLD AND METHOD FOR MANUFACTURING DRAINAGE CHANNELS

CROSS-REFERENCE TO RELATED APPLICATION

This application claims the benefit of U.S. patent application Ser. No. 62/430,431, filed Dec. 6, 2016, the entire contents of which are hereby incorporated by reference.

FIELD

This invention relates generally to drainage channels and trench-forming adjustable molds, and to a method and system for using the adjustable molds to create different-sized drainage channel castings with variable slope capabilities and configurations.

BACKGROUND

Molds are commonly used as a form to cast structural and ornamental elements used in construction and other applications. The molds are filled with cementitous materials, polymer concrete and other formable materials that are allowed to cure. The casting is then removed from the mold.

In some embodiments, the molds are designed to be reused. This avoids the need to reconstruct the mold repeatedly in order to make multiple castings of the same product. However, there are instances where a casting has multiple possible configurations. Conventionally, reusable molds had to be made and stored for each configuration of the casting, which molds cost significant resources to build and store, especially for larger castings.

Accordingly, there remains a need for a reusable mold that can be easily adjusted to accommodate variations in a casting so that multiple molds do not have to be constructed and stored for the different configurations.

BRIEF SUMMARY OF THE INVENTION

The present invention provides a reusable mold that can be easily adjusted to accommodate variations in a casting so that multiple molds do not have to be constructed and stored for the different configurations. In one embodiment, an adjustable mold for making castings of various configurations is provided. The adjustable mold comprises an adjustable die comprising a core having a protrusion, wherein the protrusion has a configuration and a first adapter having an external configuration and having a cavity, wherein the cavity is configured to detachably receive the protrusion. The adjustable mold comprises an outer portion at least partially surrounding the adjustable die to thereby define a mold, the outer portion comprising at least two sidewalls, at least two endwalls, and a base therebetween.

According to one embodiment, the configuration of the protrusion has a transverse width that varies along its axial length so as to have a first width at a first portion of the protrusion and a second width at a second portion of the protrusion that is wider or shorter than the first width. According to another embodiment, the protrusion has a triangular configuration.

According to one embodiment, the base has at least one base support and at least one base member. According to another embodiment, the core is configured to be removably attached to the base.

According to yet another embodiment, the mold comprises a second adapter having an external configuration and having a cavity, wherein the cavity is configured to detachably receive the protrusion, and wherein the external configuration of the first adapter and the external configuration of the second adapter are different.

The present invention also provides a method of making castings of various configurations, the method comprising providing an adjustable mold for making castings of various configurations, the adjustable mold comprising an adjustable die comprising a core having a protrusion, wherein the protrusion has a configuration; and a first adapter having an external configuration and having a cavity, wherein the cavity is configured to detachably receive the protrusion and an outer portion at least partially surrounding the adjustable die to thereby define a mold, the outer portion comprising at least two sidewalls, at least two endwalls, and a base therebetween. The adjustable mold is used to form a first casting.

According to one embodiment, the method comprises replacing the first adapter with a second adapter. In one embodiment, replacing the first adapter with the second adapter comprises removing the first adapter from the core and positioning the second adapter on the core.

According to another embodiment, the adjustable mold is used to form a second casting having a configuration that is different from the first casting.

BRIEF DESCRIPTION OF THE SEVERAL VIEWS OF THE DRAWINGS

The following detailed description of embodiments refers to the accompanying drawings which illustrate specific embodiments of the disclosure. Other embodiments having different structures and operations do not depart from the scope of the present disclosure. Reference will now be made to the accompanying drawings, which are not necessarily drawn to scale, and wherein.

DETAILED DESCRIPTION OF EMBODIMENTS OF THE INVENTION

Embodiments of the present invention will now be described hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
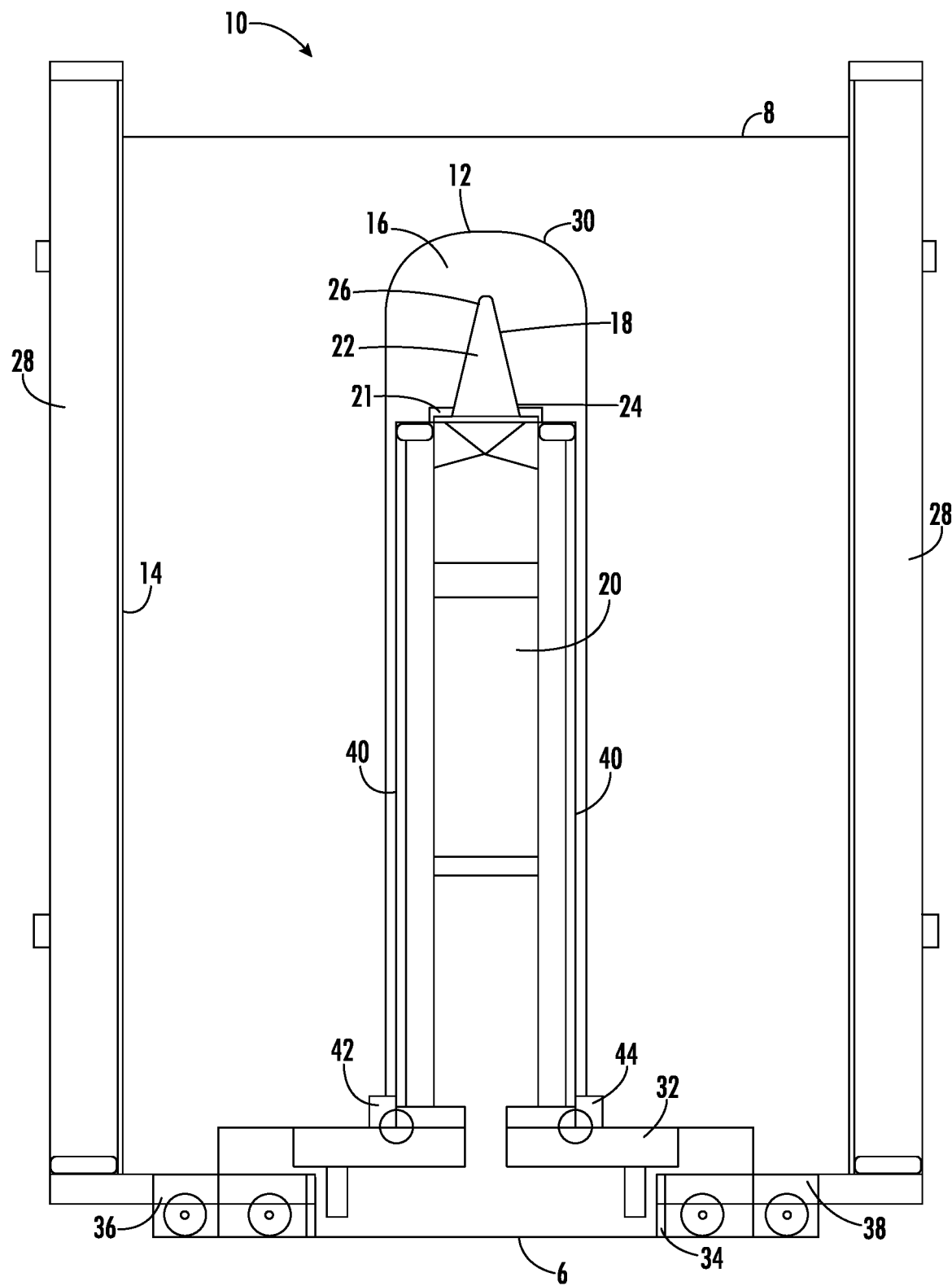
FIG. 1 is a cross-sectional view of the front of an adjustable mold in an expanded configuration according to one embodiment of the present invention, prior to the introduction of molding material.

Referring to the drawings, FIG. 1 illustrates a cross-sectional view of an adjustable mold 10 for a mold 8, such as a drainage channel, in an expanded configuration before the introduction of molding material. The adjustable mold 10 has an adjustable die 12 and an outer portion 14 at least partially surrounding the adjustable die 12 to thereby define the mold 8. The adjustable die 12 comprises an adapter 16 and a core 20, wherein the core 20 may further comprise a connector 21. In one embodiment, the adapter 16 and core 20 of the adjustable die 12 are connected through a female and male connection. In another embodiment, the adapter 16 and core 20 of the adjustable die 12 are connected through a slidable connection. In FIG. 1, the adapter 16 has a cavity 18, which represents the female portion of the connection, and the connector 21 of the core 20 has a protrusion 22, which represents the male portion of the connection. The configuration of the cavity 18 and protrusion 22 can vary. In other embodiments, the adapter 16 has the protrusion 22, while the connector 21 has the cavity 18. In still other embodiments, the cavity 18 extends through the connector 21 and into the core 20 of the adjustable die 12.

In some embodiments, the adapter 16 is removably attached to the connector 21, and the connector 21 is removably attached to the core 20. In other embodiments, the protrusion 22 is operatively coupled directly to the core 20 without use of the connector 21, wherein the core 20 has the protrusion 22 or the cavity 18. In some embodiments, the connector 21 is interchangeable and disposable, which allows for a uniform attachment of various connectors and protrusions to the core 20 while offering the potential for compatibility with various configurations, e.g., shapes, slopes, sizes, etc. of adapters without requiring that the core 20 and the adjustable mold 10 as a whole be used only for a specific design of mold 8.

The protrusion 22 has a transverse width that varies along its axial length so as to have a first width at a first portion 24 of the protrusion 22 and a second width at a second portion 26 of the protrusion 22 that is wider or shorter than the first width. The cavity 18 and protrusion 22 may be of any shape, wherein the cavity 18 is an inverse shape of the protrusion 22 and is configured to detachably receive the protrusion 22, thereby removably attaching the adapter 16 to the core 20. In the embodiment illustrated in FIG. 1, the protrusion 22 and the cavity 18 are of a triangular shape with at least two planar sides, wherein the protrusion 22 is tapered from bottom to top. In some embodiments, and as illustrated in FIG. 1, the tip of the protrusion 22 may be rounded.

Figure 2:
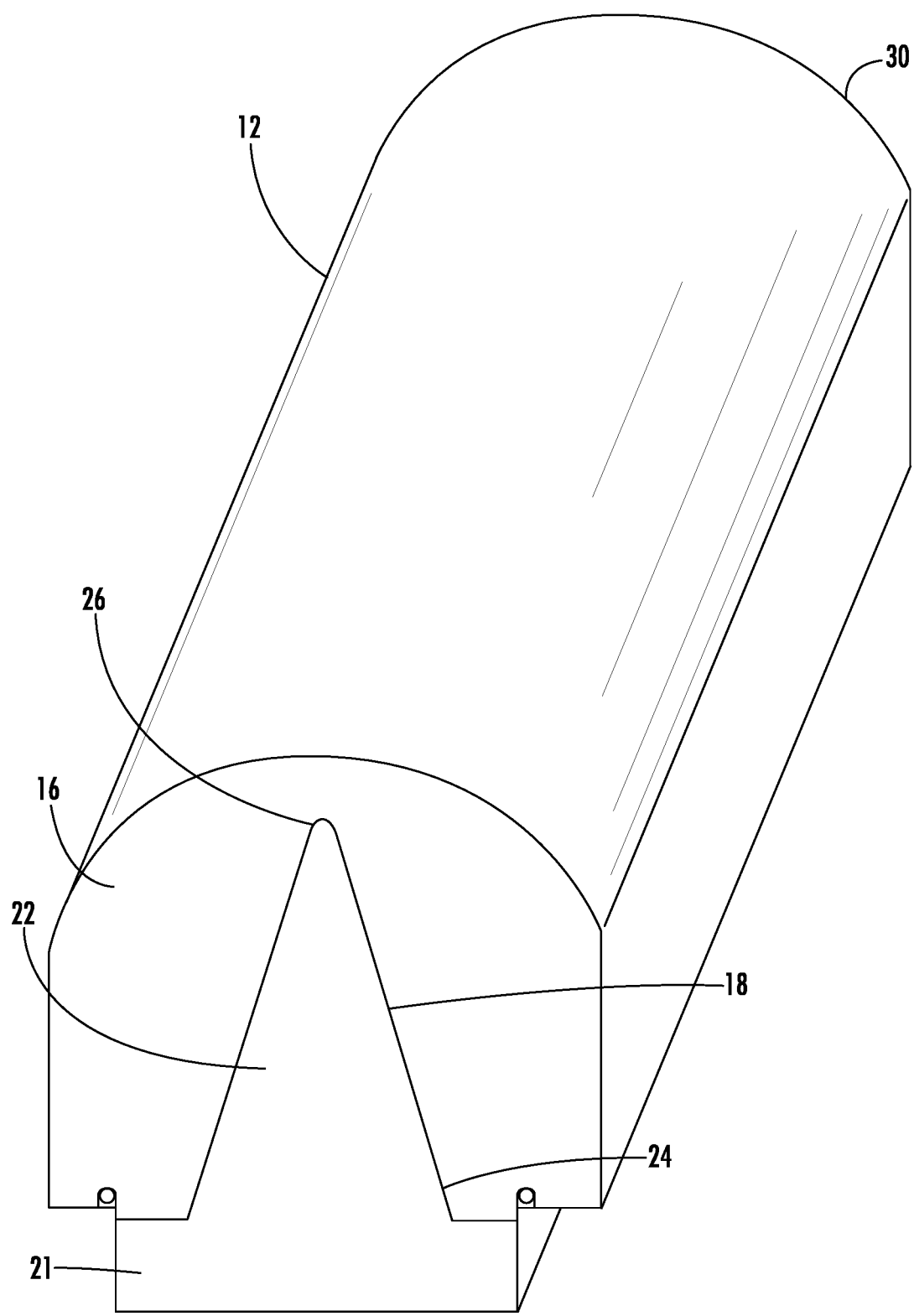
FIG. 2 is a perspective view of a portion of an adjustable die in accordance with one embodiment of the invention.

Referring now to FIG. 2, which illustrates a perspective view of a portion of the adjustable die 10, in accordance with one embodiment of the invention, the adapter 16 has the cavity 18 and is removably attached to a connector 21, which has the protrusion 22. In this embodiment, the adapter 16 is configured to be removably attached to the connector 21, which, in turn, is configured to be removably attached to the core 20, allowing for variations in the channel shape and size of the mold 8 due to the customizable nature of the interchangeable adapter 16 and connector 21 within the adjustable mold 10. Furthermore, the height of the adapter 16 may vary along the length of the adapter 16, wherein a proximal end of the adapter 16 has a height that is different than the height of a distal end of the adapter 16, thereby allowing for the molding of castings with sloped channels. In other embodiments, such as the embodiment illustrated in FIG. 3, the height of the adapter 16 is the same along the length of the adapter 16.

Referring now back to FIG. 1, the outer portion 14 has at least two sidewalls 28, at least two endwalls (not shown), and a base 32 therebetween. In some embodiments, the endwalls may be similar in design and function to the sidewalls 28. The size and shape of the sidewalls 28, endwalls, and base 32 may vary and/or be adjustable, thereby varying or adjusting the size and shape of the mold 8 to allow for the molding of castings of different configurations, e.g., shapes, slopes, sizes, etc. In other embodiments, such as the embodiment illustrated in FIG. 3, the sidewalls 28 and base 32 are planar. The base 32 has at least one base support 34 and at least one base member. The at least one base support 34 is operatively coupled to a bottom surface of the base 32 and supports the base 32 while in contact with the floor 6. In the embodiment illustrated in FIG. 1, the base 32 has two base members 36, 38, which are, preferably, removably attached to a bottom portion of the base 32 and/or base support 34.

When using the adjustable mold 10 to make a casting, molding material, such as concrete, is poured in the mold 8 until it fills the mold 8 above the height of the adjustable die 12. After pouring molding material in the mold 8 and allowing it to dry, a casting is formed and removed from the adjustable mold 10, wherein the adapter 16 and/or connector 21 may be discarded. The external surfaces and shapes of the casting are defined by the internal surfaces and positions of the at least two sidewalls 28 and at least two endwalls. In one embodiment, the internal surfaces of the at least two sidewalls 28 and at least two endwalls are smooth planes, and as such, the external surfaces of the casting are smooth planes, which may reduce the stress concentration in the casting. Alternatively, the internal surfaces of the at least two sidewalls and at least two endwalls can include one or more ribs or other features desired to define the external surfaces of the casting. The positions of the at least two sidewalls and at least two endwalls may also be altered to form castings of different widths, depths, and shapes, as described more fully below.

A purpose of the adapter 16 is to be easily removed from the core 20 and/or connector 21 and molding material so that the outer portion 14 and the core 20 can be reused with adapters 16 and connectors 21 of various configurations, e.g., shapes, slopes, sizes, etc., to thereby form molds 8 and castings of various configurations, e.g., shapes, slopes, sizes, etc. In one embodiment, the external surface and shape 30 of the adapter 16 is a half circle-like configuration comprised of three planar sides. This design reduces the stress concentration in a drainage channel casting. Specifically, in such embodiment, stress is reduced in the corners of the internal surface of the casting, such as a drainage channel, as compared to the stress concentration in the corners of a traditional, rectangular casting. Any number of internal surfaces and shapes for the casting can be defined by changing the external surface and shape 30 of the adapter 16. In this regard, in other embodiments, the external surface and shape 30 of the adapter 16 is a parabolic curve or comprises more than three planar sides.

The various portions of the adjustable mold 10 according to example embodiments of the invention can be made of any of various materials. The outer portion 14 and core 20 can be made of metal, wood, or plastic, as can the various portions of the outer portion 14. The adapter 16 and the connector 21 are preferably made of material that is formable or easily-shaped and removable, as explained above. In some embodiments, such material is a formed plastic body. In other embodiments, such material is expanded polystyrene. The cavity and protrusion can include surface treatments to make the connection therebetween sticky, so long as the adapter is removable from the core. In some embodiments, the outer portion 14 and/or adjustable die 12 comprise a surface coating or covering, which can be fixedly adhered to the outer portion 14 and/or adjustable die 12 or reapplied prior to each molding of a casting. The surface coating may be on the side of the outer portion 14 and/or adjustable die 12 in contact with the molding material and structured to have no or limited adherence to the molding material. Such no or limited adherence to the molding material may allow the outer portion 14 and/or adjustable die 12 to be reusable. In some embodiments, the surface coating may be a film having an adhesive backing that will adhere to the outer portion 14 and/or adjustable die 12 with a relatively smooth outer surface that has no or limited adherence to the molding material. In such embodiments, the surface coating can be a film comprising a metal (e.g., aluminum) and/or plastic (e.g., polypropylene or polyester), including metallized plastic. In other embodiments, the surface coating is a sprayed or brushed on coating, such as a polyeurea or a styrospray (e.g. styrospray 1000), that has no or limited adherence to the molding material.

The adjustable die 12 is configured to be removably attached to the base 32 at the core 20. In the embodiment illustrated in FIG. 1, the core 20 is removably attached to a top portion of the base 32. Alternatively, the core 20 can be removably attached to an aperture in the base 32 by a mechanism, which, in such embodiment, the aperture's length and width is greater than the length and width of the core 20. For example, the core 20 can have numerous holes on the exterior surface of the core 20 at different heights, and the inner walls of the aperture in the base 32 can have numerous locking mechanisms, such as indexing plungers, that, when aligned with the holes on the exterior surface of the core 20 at a desired height, lock the position of the core 20 in place at such height. In such embodiment, two base members 36, 38 may be positioned at a distance relative to each other that is greater than the width of the core 20, and the core 20 may be adjusted and positioned at different heights within the outer portion 14, which gives the adjustable mold 10 the flexibility to change the overall height of the mold 8. Moving the position of the core 20 within the outer portion 14 toward the floor 6 increases the overall height of the mold 8, while moving the position of the core 20 within the outer portion 14 away from the floor 6 decreases the overall height of the mold 8.

In other embodiments, the overall height of the mold 8 is adjusted by merely removing the then-existing core 20 from the adjustable mold 10 and replacing it with a core 20 of a desired height. In yet still other embodiments, the overall height of the mold 8 is adjusted by merely removing the then-existing adapter 16 and/or connector 21 from the adjustable mold 10 and replacing it with an adapter 16 and/or connector 21 of a desired height. The shape of the inner portion of the mold 8, i.e., the internal surface of the casting, can be adjusted by replacing the then-existing adapter 16 and/or connector 21 with an adapter and/or connector of a desired shape, thereby customizing, for example, the channel shape of a drainage channel mold and casting.

As illustrated in FIG. 1, the core 20 of the adjustable mold 10 has at least two core walls 40 that at least partially form the inner channel of the mold 8. In some embodiments, the core walls 40 are operatively coupled to a top surface of the base 32. The core walls 40 are positioned around the core 20 and, in some embodiments, may be operatively coupled to the core 20. In other embodiments, the core walls 40 may not be permanently fixed to the core 20, allowing the core walls 40 to move away from the core 20 towards the sidewalls 28, thereby increasing the width of the core 20 and the overall width of the adjustable die 12. As illustrated in FIG. 1, in one embodiment, the core walls 40 are operatively coupled to one or more core wall member 42, 44, which are, in turn, operatively coupled to the base 32.

Different types of mechanisms for allowing two core wall members 42, 44 and/or two core walls 40 to move toward and/or away from each other and for selectively locking two core walls members 42, 44 and/or two core walls 40 relative to each other will be apparent to one of ordinary skill in the art in view of this disclosure. In one embodiment, two core wall members 42, 44 are configured to be removably attached to the base support 34 and/or base 32 by a mechanism, such as one or more track systems, that allows the two core wall members 42, 44, and therefore the two core walls 40, to slide toward and/or away from each other. Such a mechanism may include one or more locking mechanisms, such as a bolt and wing nut placed in a track, which allows a user to lock the two core wall members 42, 44 at a position and desired distance away from each other. Moving the core walls 40 farther away or closer to the core 20 at least partially adjusts the overall width of the adjustable die 12 and, thereby, may produce a casting and/or mold 8 of variable internal channel width. Different types of mechanisms for allowing the two (or more) core wall members 42, 44 to move toward and/or away from each other and for selectively locking the two (or more) core wall members 42, 44 relative to each other will be apparent to one of ordinary skill in the art in view of this disclosure.

In one embodiment of the invention, an adapter 16, connector 21, core 20, two core walls 40, two core wall members 42, 44, two sidewalls 28, two endwalls, base 32, base support 34, and/or two base members 36, 38 are not fixed to each other and some or all of these elements of the adjustable mold 10 can move independently of each other. Preferably, the adapter 16, connector 21, core 20, two core walls 40, two core wall members 42, 44, two sidewalls 28, two endwalls, base 32, base support 34, and/or two base members 36, 38 are each operatively coupled by mechanisms that allow a user to move some or all of these elements relative to its other respective element. In other embodiments, each pair of elements listed above may be operatively coupled to and fixed relative to the other elements of the adjustable mold 10.

The at least two sidewalls 28 and at least two endwalls are configured to be removably attached to at least one of the at least one base member 36, 38 and are able to be positioned at different distances and slopes relative to each other, which gives the adjustable mold 10 the flexibility to change the overall width, depth, and shape of the mold 8 and, thus, the configuration of the casting. The at least two sidewalls 28 and at least two endwalls can be configured to be removably attached to the at least one base support 34 by a mechanism, such as one or more track systems, that allows the at least two sidewalls 28 and at least two endwalls to slide toward or away from its other respective sidewall or endwall. Such a mechanism may include one or more locking mechanisms, such as a bolt and wing nut placed in a track, which allows a user to lock the at least two sidewalls and/or two endwalls at a position and desired distance away from each other. Alternatively, the sidewalls 28 and/or at least two endwalls can be hingedly connected to the at least one base support 34 through hinges. This hinged configuration may be useful to adjust the slope of the at least two sidewalls and/or at least two endwalls and/or for aiding in the removal of the mold 8 from the adjustable mold 10. In other embodiments, the sidewalls 28 and/or endwalls may be operatively coupled directly to the base 32 instead of the at least one base member 36, 38. In some embodiments of the invention, the core walls 40 and the core wall members 42, 44 may be configured in a manner similar to that of the sidewalls 28 and base members 36, 38 as previously described, allowing for the core walls 40 to be positioned at different distances and slopes relative to each other, which gives the adjustable mold 10 the flexibility to change the overall configuration, e.g., width, depth, and shape of at least a portion of the adjustable die 12, the mold 8, and, thus, the configuration of the casting, including the configuration of the internal surface of a drainage channel casting.

Adjusting the slope of the at least two sidewalls 28, at least two endwalls, and/or at least two core walls 40 adjusts the thickness of the mold 8, and thus the thickness of the casting. Increasing the thickness of the casting at areas of higher stress concentration minimizes the need to use additional materials to support the casting at such areas of higher stress concentration and, thereby, reduces the cost of the casting. For example, a tapered thickness of walls of the casting can be created by changing the distance between leading ends of the at least two sidewalls 28, while keeping trailing ends of the at least two sidewalls 28 at the same distance apart.

In other embodiments, the at least two sidewalls 28 and/or at least two endwalls are of integral unitary construction with the at least one base support 34 but are still capable of being positioned at different distances from each other through adjustment mechanisms in the at least one base member 36, 38. Moving the position of the at least two sidewalls 28 away from each other increases the overall width of the mold 8, while moving the position of the at least two sidewalls 28 toward each other decreases the overall width of the mold 8. Similarly, moving the position of the at least two endwalls away from each other increases the overall depth of the mold 8, while moving the position of the at least two endwalls toward each other decreases the overall depth of the mold 8. Different types of mechanisms for allowing the at least two sidewalls 28 and/or at least two endwalls to move toward and/or away from each other and for selectively locking the at least two sidewalls 28 and/or at least two endwalls relative to its other respective sidewall or endwall will be apparent to one of ordinary skill in the art in view of this disclosure.

In one embodiment, two base members 36, 38 are not coupled to the base 32 and/or base support 34 but are held in a position relative to each other merely by the weight or shape of the adjustable die 12. In another embodiment, two base members 36, 38 are configured to be removably attached to the base 32 and/or base support 34 by a mechanism, such as one or more track systems, that allows the two base members 36, 38 to slide toward and away from each other. Such a mechanism may include one or more locking mechanisms, such as a bolt and wing nut placed in a track, which allows a user to lock the two base members 36, 38 at a position and desired distance away from each other. Different types of mechanisms for allowing the two (or more) base members 36, 38 to move toward and/or away from each other and for selectively locking the two (or more) base members 36, 38 relative to each other will be apparent to one of ordinary skill in the art in view of this disclosure.

In some embodiments, the base 32 or bottom portion of one or both sidewalls 28 have inserts, or other protrusions, extending therefrom into the mold 8. When the molding material is poured into the mold 8, the inserts create recesses in upper edges of walls of the casting. In one embodiment, such recesses are used for positioning during installation and/or for securing a cover to the top of the casting. In such embodiment, pins can be inserted into the recesses to secure a cover to the top of the casting. Inserts provide increased flexibility and customization of the mold 8 and casting.

In some embodiments of the invention, one endwall of the adjustable mold 10 has an extension around its periphery, the extension extending from such endwall into the mold 8. The extension creates a groove or other recess in one end of the casting formed from the mold 8, such as a U-shaped groove. In such embodiments, the other endwall of the adjustable mold 10 generally has a recess around its periphery, the recess extending into such endwall, creating a tongue or other extension in the other end of the casting formed from the mold 8, such as a U-shaped tongue. Such grooves and tongues are sized such that the groove in one end of the casting can receive the tongue in the other end of the casting to interlock the two sections together in an aligned relationship.

Figure 3:
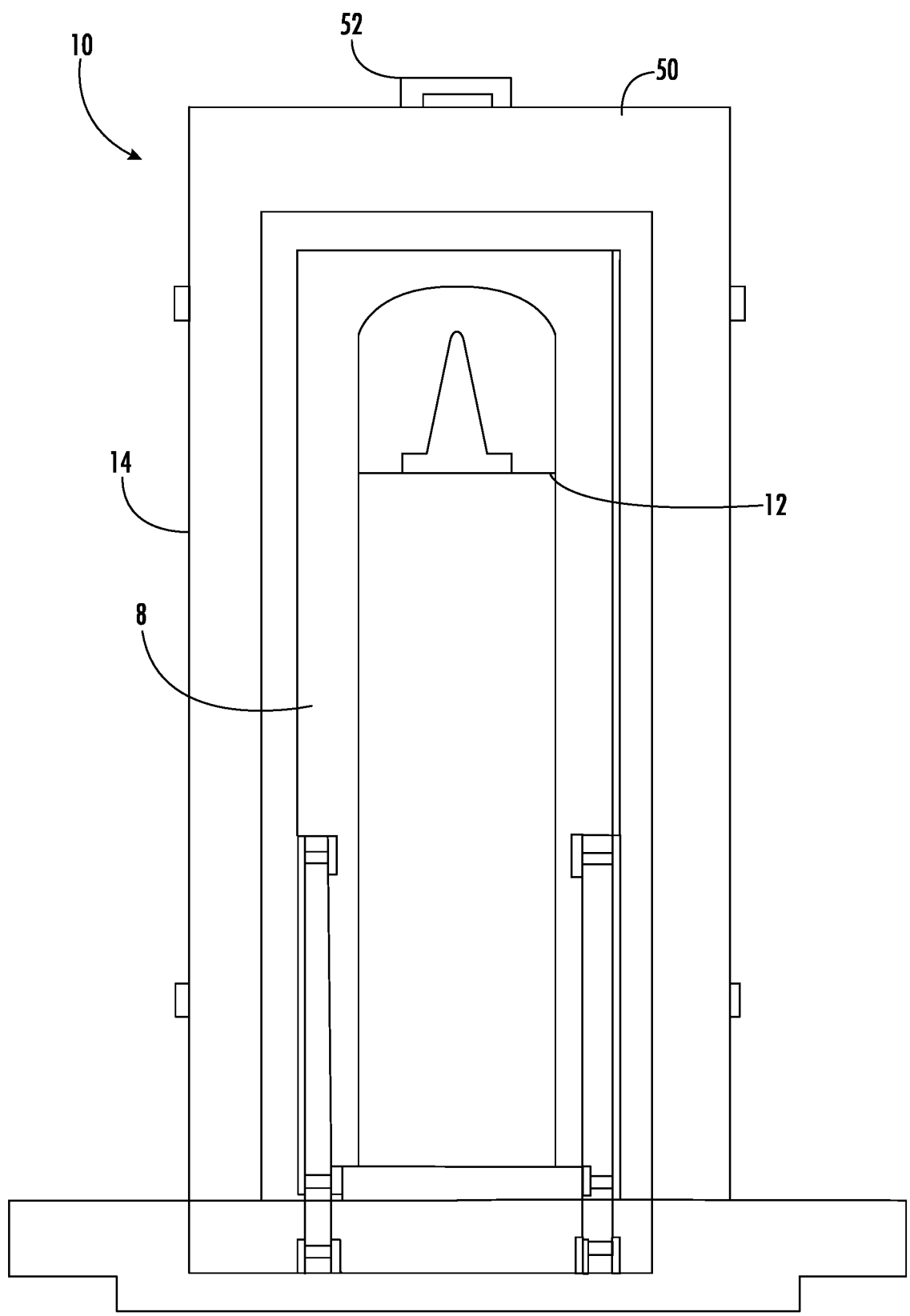
FIG. 3 is a cross-sectional view of the front of an adjustable mold in an assembled, enclosed configuration in accordance with one embodiment of the invention.

Referring still to the drawings, FIG. 3 illustrates a cross-sectional view of the front of an adjustable mold 10 in an assembled, at least partially surrounded and enclosed configuration, in accordance with one embodiment of the invention. As illustrated in FIG. 3, the outer portion 14 of the adjustable mold 10 encloses the adjustable die 12 to form the shape of a mold 8 between the outer portion 14 and the adjustable die 12. As previously discussed, molding material, such as concrete, is poured in the mold 8 until it fills the mold 8 above the height of the adjustable die 12. After the molding material is poured into the mold 8, the molding material is allowed to dry, whereafter the formed casting may be removed from the adjustable mold 10. In some embodiments, the outer portion 14 of the adjustable mold 10 further comprises a lid or cover 50 which is operatively coupled to the periphery of the top of the enclosed sidewalls 28 and/or endwalls to further define the shape of the casting or mold 8 and to protect the mold 8 while the casting is drying. In one embodiment, the cover 50 is secured in place by the weight of the cover 50 itself. In other embodiments, the cover 50 is secured to the periphery of the top of the outer portion 14 of the adjustable mold 10 by one or more locking mechanisms, such as bolts or clamps, which prevent the cover 50 from moving separately from the outer portion 14 while the mold 8 is drying. Other methods for securing the cover 50 to the outer portion 14 will be apparent to one of ordinary skill in the art in view of this disclosure. The cover 50 may further comprise a handle 52 to assist in lifting and removing the cover 52 from the adjustable mold 10 by machinery or an operator of the adjustable mold 10.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. It should be understood that "operatively coupled" or "coupled," when used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Although specific terms are employed herein, they are used in a generic and descriptive sense only and not for purposes of limitation. In addition, where possible, any terms expressed in the singular form herein are meant to also include the plural form and/or vice versa. As used herein, "at least one" shall mean "one or more" and these phrases are intended to be interchangeable. Accordingly, the terms "a"

and/or "an" shall mean "at least one" or "one or more," even though the phrase "one or more" or "at least one" is also used herein.

That which is claimed:

1. An adjustable mold for making castings of various configurations, the adjustable mold comprising:
   an adjustable die comprising:
      a core having first and second core walls and a protrusion, wherein the protrusion has a configuration; and
      a first adapter having an external configuration and having a cavity, wherein the cavity is configured to detachably receive the protrusion; and
   an outer portion at least partially surrounding the adjustable die to thereby define a mold, the outer portion comprising at least two sidewalls, at least two endwalls, and a base therebetween,
   wherein the first and second core walls and the at least two sidewalls are movably attached to the base and wherein at least one of (i) the first and second core walls are each adjustable along the base so that a distance between the first and second core walls is adjustable, and (ii) the at least two sidewalls are adjustable along the base so that a distance between the at least two sidewalls is adjustable thereby providing flexibility to change an overall width, depth, slope and shape of an interior of the adjustable mold and resulting casting.

2. The mold according to claim 1, wherein the configuration of the protrusion has a transverse width that varies along its axial length so as to have a first width at a first portion of the protrusion and a second width at a second portion of the protrusion that is wider or shorter than the first width.

3. The mold according to claim 1, wherein the protrusion has a triangular configuration.

4. The mold according to claim 1, wherein the base comprises at least one base support and at least one base member.

5. The mold according to claim 1, wherein the core is configured to be removably attached to the base.

6. The mold according to claim 1, further comprising a second adapter having an external configuration and having a cavity, wherein the cavity is configured to detachably receive the protrusion, and wherein the external configuration of the first adapter and the external configuration of the second adapter are different.

7. The mold according to claim 1, wherein the core is movably adjustable about an axial length of the adjustable mold so as to position the core at different heights relative to the outer portion.

8. A method of making castings of various configurations, the method comprising:
   providing an adjustable mold for making castings of various configurations, the adjustable mold comprising:
      an adjustable die comprising:
         a core having first and second core walls and a protrusion, wherein the protrusion has a configuration; and
         a first adapter having an external configuration and having a cavity, wherein the cavity is configured to detachably receive the protrusion; and
      an outer portion at least partially surrounding the adjustable die to thereby define a mold, the outer portion comprising at least two sidewalls, at least two endwalls, and a base therebetween, wherein the first and second core walls and the at least two sidewalls are movable attached to the base;
   adjusting at least one of (i) the first and second core walls along the base so that a distance between the first and second core walls is adjusted and (ii) the at least two sidewalls along the base so that a distance between the at least two sidewalls is adjusted thereby providing flexibility to change an overall width, depth, slope and shape of an interior of the adjustable mold and resulting casting; and
   using the adjustable mold to form a first casting.

9. The method according to claim 8, wherein the configuration of the protrusion has a transverse width that varies along its axial length so as to have a first width at a first portion of the protrusion and a second width at a second portion of the protrusion that is wider or shorter than the first width.

10. The method according to claim 8, wherein the protrusion has a triangular configuration.

11. The method according to claim 8, wherein the base comprises at least one base support and at least one base member.

12. The method according to claim 8, and wherein the core is configured to be removably attached to the base.

13. The method according to claim 8, further comprising providing a second adapter having an external configuration and having a cavity, wherein the cavity is configured to detachably receive the protrusion.

14. The method according to claim 13, wherein the external configuration of the first adapter and the external configuration of the second adapter are different.

15. The method according to claim 8, further comprising adjusting the core about an axial length so that a height of the core is adjusted relative to the outer portion.

16. The method according to claim 13, further comprising replacing the first adapter with the second adapter.

17. The method according to claim 16, wherein replacing the first adapter with the second adapter comprises:
   removing the first adapter from the core; and
   positioning the second adapter on the core.

18. The method according to claim 16, further comprising using the adjustable mold to form a second casting having a configuration that is different from the first casting.

* * * * *